(12) United States Patent
Byrnes et al.

(10) Patent No.: US 8,747,012 B2
(45) Date of Patent: Jun. 10, 2014

(54) TIE ROD END WITH FRICTION REDUCING COATING

(75) Inventors: Thomas J. Byrnes, St. Charles, MO (US); Lawrence H. Fitch, Cahokia, IL (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 12/399,460

(22) Filed: Mar. 6, 2009

(65) Prior Publication Data
US 2009/0226244 A1 Sep. 10, 2009

Related U.S. Application Data

(60) Provisional application No. 61/034,688, filed on Mar. 7, 2008.

(51) Int. Cl.
*F16C 11/00* (2006.01)
(52) U.S. Cl.
USPC ............................................ 403/135; 403/122
(58) Field of Classification Search
USPC .................................. 403/122–126, 132–135
See application file for complete search history.

(56) References Cited

U.S. PATENT DOCUMENTS

| | | | |
|---|---|---|---|
| 2,748,081 A | 5/1956 | Peterson et al. | |
| 2,885,248 A | 5/1959 | White | |
| 3,197,245 A | 7/1965 | Beer | |
| 3,314,884 A | 4/1967 | Cover et al. | |
| 4,093,578 A | 6/1978 | Vasiliev et al. | |
| 4,231,673 A | 11/1980 | Satoh et al. | |
| 4,488,977 A * | 12/1984 | Patrichi | 508/103 |
| 4,577,989 A * | 3/1986 | Ito | 403/140 |
| 4,591,276 A * | 5/1986 | Schneider et al. | 384/206 |
| 4,987,865 A | 1/1991 | Schenkel | |
| 5,011,320 A | 4/1991 | Love et al. | |
| 5,230,815 A | 7/1993 | Rountree | |
| 5,564,853 A * | 10/1996 | Maughan | 403/137 |
| 5,593,232 A | 1/1997 | Maier | |
| 5,630,669 A * | 5/1997 | Stewart | 384/570 |

(Continued)

FOREIGN PATENT DOCUMENTS

| | | |
|---|---|---|
| GB | 875003 | 8/1961 |
| JP | 2003262213 A | 9/2003 |
| JP | 3523021 B2 | 4/2004 |

OTHER PUBLICATIONS

Polycondensation 2006 conference, American Chemical Society, Aug. 27-30, 2006, (pp. 1-147).

*Primary Examiner* — Gregory Binda
*Assistant Examiner* — Nahid Amiri
(74) *Attorney, Agent, or Firm* — Robert L. Stearns; Dickinson Wright, PLLC

(57) ABSTRACT

A tie rod end includes a stud with a spherical ball at one end and a bearing having a concave spherical bearing running surface for sliding abutment with the ball. The contact area of the ball or the bearing running surface has a lubrication groove to facilitate channeling grease, wherein the grooved member is coated with a bonded lubrication coating. The lubrication coating reduces the initial preload torque from that which would be ordinarily be perceived as undesirable to a torque that is perceived as desirable. The lubrication coating is substantially consumed on the high contact area over about 100 to 500 thousand cycles, with the resulting torque being remaining greater than zero, which is also perceived as being desirable.

10 Claims, 3 Drawing Sheets

(56) References Cited

U.S. PATENT DOCUMENTS

| | | | |
|---|---|---|---|
| 5,713,324 A | 2/1998 | Frame et al. | |
| 5,772,337 A * | 6/1998 | Maughan et al. | 384/206 |
| 5,795,092 A | 8/1998 | Jaworski et al. | |
| 5,904,436 A * | 5/1999 | Maughan et al. | 403/140 |
| 6,042,293 A * | 3/2000 | Maughan | 403/135 |
| 6,082,923 A * | 7/2000 | Maughan | 403/135 |
| 6,123,009 A | 9/2000 | Kanayama et al. | |
| 6,164,861 A * | 12/2000 | Maughan | 403/135 |
| 6,289,760 B1 * | 9/2001 | Park | 74/473.34 |
| 6,505,990 B1 * | 1/2003 | Maughan | 403/135 |
| 6,886,235 B2 * | 5/2005 | Suzuki et al. | 29/558 |
| 6,979,129 B2 | 12/2005 | Farbaniec et al. | |
| 7,260,878 B2 | 8/2007 | Kondoh | |

\* cited by examiner

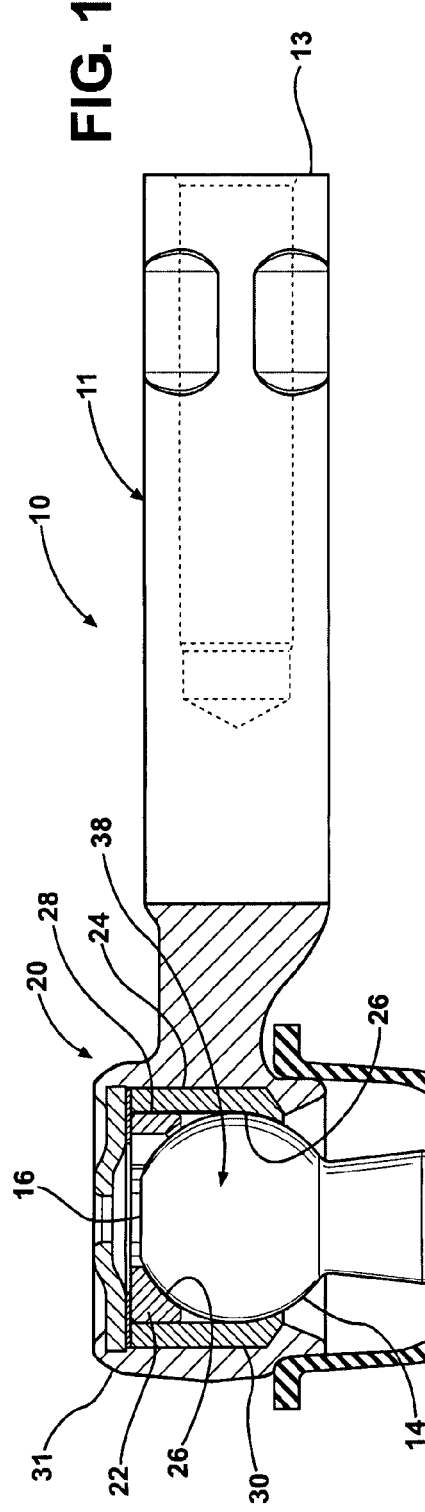

TIE ROD END WITH FRICTION REDUCING COATING

CROSS-REFERENCE TO RELATED APPLICATION

This application claims the benefit of U.S. Provisional Application Ser. No. 61/034,688, filed Mar. 7, 2008, which is incorporated herein by reference in its entirety.

BACKGROUND OF THE INVENTION

1. Technical Field

This invention relates generally to joints for linking relatively movable vehicle steering components to one another, and more particularly to tie rod ends.

2. Related Art

Vehicle suspension systems and steering systems typically include joints, such as tie rod end ball-type joints for operable attachment of a tie rod end to a steering knuckle and a ball joint for coupling the steering knuckle to a steering yoke. In addition, other applications, such as carnival rides or any other application having relatively movable joints, typically have ball joints to facilitate the relative movement between linked components. Upon assembly of the tie rod end ball joints, it is generally desirable to build in frictional resistance to joint movement that is within a predetermined torque tolerance. If the frictional resistance or torque is too high or too low, the ball joint may exhibit a reduce life in use, and further, can result in a perceived "feel" that indicates the part as being undesirable. For example, if the tie rod end exhibits frictional resistance that is in excess of the desired tolerance limit, the vehicle operator or mechanic may "feel" the high torque required to move the tie rod end, and thus, believe the tie rod end to be less than desirable. However, a tradeoff exists in that if the tie rod end is assembled with an initially desired torque resulting in a "feel" of perceived quality, the frictional resistance of the tie rod end decreases from the initially set limit, and thus, eventually results in a perceived loose feel, which can also result in replacement or servicing of the tie rod end. Accordingly, a tradeoff exists between providing a tie rod end with an initially high degree of frictional resistance and providing a tie rod end with an initially low degree of frictional resistance.

Efforts have been made to coat ball joints to provide an initially reduced, desired level of frictional resistance, while at the same time providing the ball joint with a long and useful life. However, all known efforts of coating a ball joint have resulted in the frictional resistance of the ball joint either remaining initially too high and/or with the coating being prematurely being scraped off the coated surface.

SUMMARY OF THE INVENTION

A tie rod end having an extended useful life based at least in part on "feel" is provided. In accordance with one aspect of the invention, the tie rod end includes a stud having a spherical ball at one end and a bearing having a concave spherical bearing surface for sliding abutment with the ball. One of the ball or the bearing surface has a lubrication groove formed therein. Further, the ball or the bearing surface having the lubrication groove has a lubrication coating bonded thereto.

In accordance with another aspect of the invention, the tie rod end has a stud having a ball with a convex surface and a bearing having a concave bearing surface supporting the ball and together providing a movable joint. The ball and the bearing surface are fabricated of metal and the movable joint provides a certain resistance to movement measured as torque when the joint is moved through a pivot cycle. The torque is greatest when the joint is moved through the first pivot cycle and is then diminishing along a curve to a lesser torque when the joint has moved through about one million pivot cycles. A wearable friction-reducing coating is applied to at least one of the ball and bearing surface with the effect of lowering the level of torque of the first pivot cycle and then wearing away over time to continue reducing the torque but providing essentially the same level of torque at the one millionth pivot cycle as the joint would have were no such coating applied.

In accordance with further aspects of the invention, the contact area of the ball and/or the bearing running surface is coated with a bonded lubrication coating, such as that sold under the name Sunoloy®. The lubrication coating reduces the initial preload torque from that which would result under the same conditions if the lubrication coating were not present to a predetermined torque that is "perceived" as desirable. Further, the lubrication coating is provided to be substantially consumed on a high contact area of the tie rod end in use over about 100 to 500 thousand cycles, with the resulting torque being between about 10 to 20 in-lbs after about 1 million cycles, which corresponds generally to the resulting torque had the coating not been incorporated.

Accordingly, the lubrication coating provides the tie rod end with a "perceived" initial, unused torque setting that is desirable. This is particularly important upon initial assembly of the tie rod end. If the perceived torque is too high upon initial assembly, the tie rod end may be perceived to be less than undesirable. In addition, upon extended use, whereupon the lubrication layer has been fully or substantially consumed in the contact area between the ball and the bearing, such as after about 100 to 500 thousand cycles, the torque remains greater than zero, which is also perceived as being desirable.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 1 is a cross-sectional view of a tie rod end constructed in accordance with one presently preferred aspect of the invention;

FIG. 2 is a plan view of a coated upper bearing of the tie rod end of FIG. 1;

FIG. 3 is a plan view of a coated lower bearing of the tie rod end of FIG. 1;

DETAILED DESCRIPTION OF PRESENTLY PREFERRED EMBODIMENTS

Figure 4:
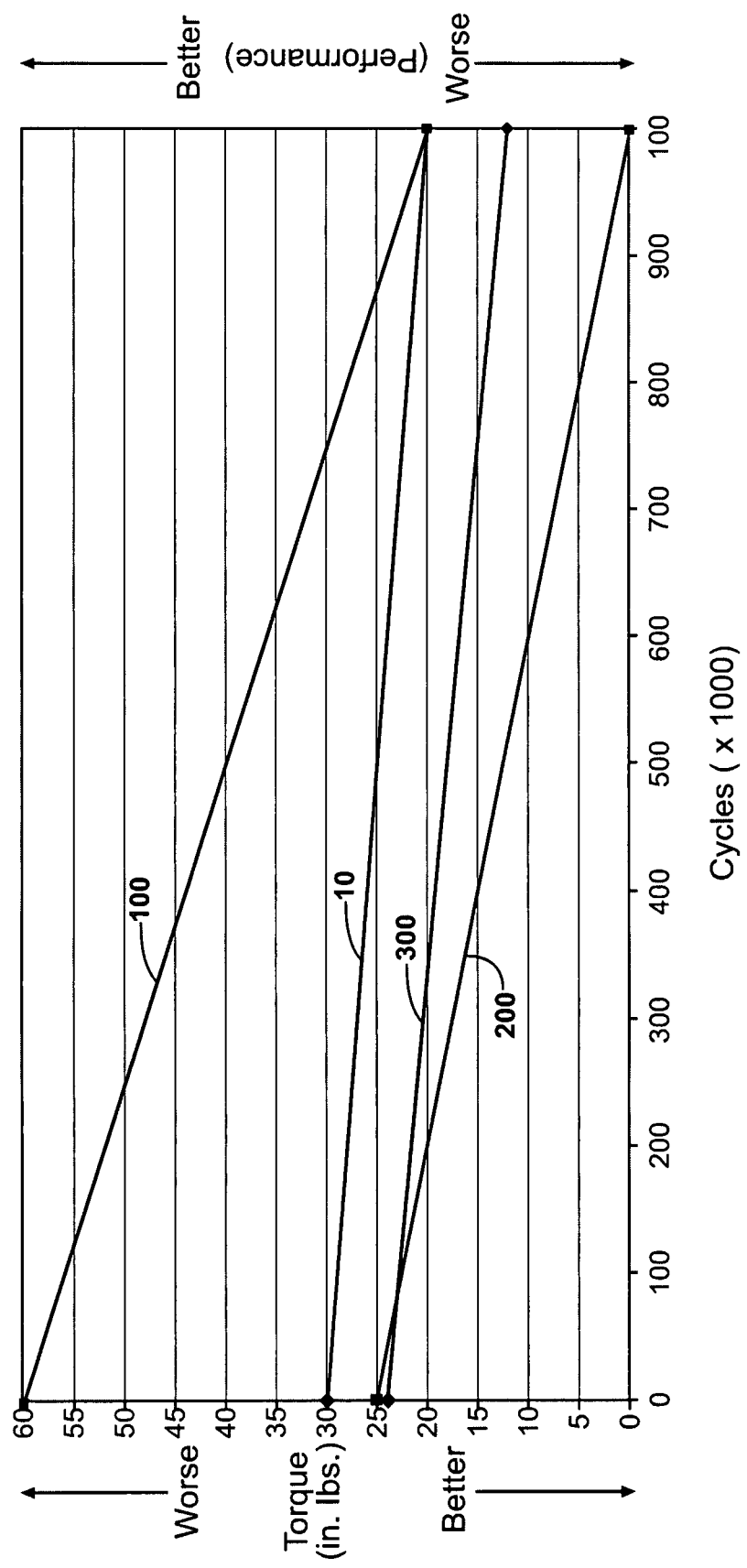
FIG. 4 is a graph illustrating torque of the tie rod end of FIG. 1 in comparison to other conventional tie rod ends versus number of cycles of the tie rod ends.

Referring in more detail to the drawings, FIG. 1 illustrates an outer tie rod end "steering" ball-type joint assembly, referred to hereafter as tie rod end 10, constructed in accordance with one presently preferred embodiment of the invention. The tie rod end 10 has a tie rod 11 with an end 13 configured for attachment to an inner steering component, such as an inner tie rod assembly via an adjuster, for example, and a stud 12 with a ball 14 at one end 16 and an opposite end 18 configured for attachment to a vehicle steering member, such as by threads 19, for example, wherein the vehicle steering member could be a steering knuckle or steering yoke (not shown), for example. The tie rod end 10 further includes a bearing assembly 20 configured for sliding engagement with the ball 14, wherein the loading in use between the ball 14 and the bearing assembly 20 is radial or substantially radial along the length of the tie rod 11, such as between about 400 to 1800 lbs, while the axial loading imparted on the tie rod end 10 along the length of the stud 12 in use is negligible or virtually nothing, unlike a typical "suspension" ball joint, which could see an axial force over a range of about 1000 to 2000 lbs. The bearing assembly 20 can be provided having first and second bearing portions, also referred to as an upper and lower bearing 22, 24, respectively, configured to slidingly engage opposite sides of the ball 14. It should be recognized that the bearing assembly 20 could be provided as any type of split bearing or as a bearing constructed of a unitary, monolithic piece of material, if desired for the application. Further yet, the tie rod end 10 includes a wearable friction-reducing lubrication coating, represented generally at 26, applied and bonded to one of the ball 14 or the bearing assembly 20, but preferably not both, as this has been shown to have negative consequences on the tie rod, including increasing the torque in use. The lubrication coating 26 used in the experiments conducted is a proprietary polymer based coating material that can be purchased, for example, under the federally registered trademark "Sunoloy", and more particularly under the product Sunoloy 402, from Sun Coating Company in Plymouth, Mich. The lubrication coating 26 as applied provides the tie rod end 10 with at least two enhanced performance features. First, it reduces the friction between the ball 14 and the bearing assembly 20 upon being initially assembled, and second, it is substantially consumed in the contact areas between the ball 14 and the bearing assembly 20 over the initial stages of the useful life of the tie rod end 10, such as between about 100 to 500 thousand cycles of the tie rod end 10, thereby resulting in the ball 14 and upper and lower bearing portions 22, 24 exhibiting reduced wear. Accordingly, the torque required to pivot the tie rod end 10 is reduced over its useful life by a lesser extent than if the lubrication coating 26 were not provided.

The first and second bearing portions 22, 24 can be constructed of any suitable metal, such as a sintered powder metal, for example. Each bearing portion 22, 24 has respective outer cylindrical walls 28, 30 extending between opposite ends, wherein the walls 28, 30 are sized suitably for receipt in the housing or socket 31 of the tie rod 11. Each bearing portion 22, 24 has a substantially concave spherical bearing surface 32, 34, respectively, having a generally similar spherical curvature as the ball 14 for sliding abutment therewith. As shown in FIGS. 2 and 3, respectively, the bearing portions 22, 24 are also shown as having a plurality of lubrication grooves 36 extending radially outwardly from the bearing surfaces 32, 34. The grooves 36 extend between and through the opposite ends of the respective bearing portions 22, 24 with sharp edges 37 being formed at the junction of the respective bearing surfaces 32, 34 and the grooves 36. The grooves 36 act primarily to transfer lubricant, such as grease, for example, to prevent pressurization of the lubricant within the bearing assembly and to reduce friction between the bearing assembly 20 and the ball 14, thereby extending the useful life of the tie rod end 10. It should be understood that the grooves 36 can be formed with a multitude of shapes and depths, as desired. To further facilitate the flow of the lubricant, the upper bearing 24 is represented as having a lubrication slot 39 extending through its uppermost surface to allow the lubrication to free flow therethrough.

The stud 12 can be constructed from any suitable metal, such as AISI 4140 steel, for example. The ball 14 is represented here as having a substantially spherical bearing surface 38 and is further represented, by way of example, as being free from any lubrication coating, although a lubricating coating could be formed on the bearing surface 38 of the ball fi the lubrication grooves are formed on the ball 14 and not the bearing assembly 20.

The lubrication coating 26 is applied and bonded to the first and second bearing surfaces 32, 34, and is shown here, by way of example and without limitation, as being applied to the entire outer surfaces of the bearing portions 22, 24. Any suitable method of applying and bonding the lubrication coating 26 to the bearing surfaces 32, 34 is contemplated, such as dipping, spraying or a spray and tumble process, for example. The "as bonded" thickness of the lubrication coating 26 is in the micron level, and thus, it does not significantly impact the stack-up tolerances. With the lubrication coating 26 being applied directly to the first and second bearing surfaces 32, 34, the coating 26 is assured of not being prematurely scraped off the bearing portions 22, 24, such as would be the case if the lubrication coating were only applied to the ball 14. This would result due to the edges 37 on the bearing portions 22, 24 scraping against the bearing surface 38 of the ball 14, whereupon the torque of the tie rod end 10 would be increased due to the scraped off coating material tending to bind the joint. Of course, if the ball 14 were to have lubrication grooves and the bearing portions 22, 24 were to be configured without lubrication grooves, the application of the lubrication coating 26 would be reversed, with the coating being applied to the contact areas of the ball 14 and not to the bearing surfaces 32, 34. Accordingly, it is preferable to at apply the lubrication coating to the bearing surface having the lubrication grooves.

As best shown in FIG. 4, upon assembly of the tie rod end 10, the lubrication coating 26 has an affect of reducing the initial preload torque from that which would result under the same conditions if the lubrication coating were not present, as exhibited by the same tie rod end 100 not having the lubrication coating 26. The values shown in the graph of FIG. 4 were obtained on a 3-axis test simulator. As can be seen, the affect of the lubrication coating 26 between similar tie rod ends 10, 100 reduces the initial preload torque from a level, such as by about 30 to 40 in-lbs, of approximately 60 in-lbs on tie rod end 100 (ordinarily perceived by "feel" as being undesirable) to an initial preload torque of about 30 in-lbs on tie rod end 10 (ordinarily perceived by "feel" as a good and desirable part).

Also shown in FIG. 4 is another set of tie rod ends 200, 300. The tie rod end 200 is constructed having a standard 2 piece acetal snap over equator bearing with an acetal floater, with no preload. As tested, the tie rod end 200 had an initial preload torque of about 25 in-lbs, which is ordinarily perceived as being slightly better than the tie rod end 10, however, after performing a 1 million cycle test, the resulting preload torque of the tie rod end 200 fell to about zero (0), which is ordinarily perceived to be a bad component, particularly if the tie rod is accompanied by high radial deflection.

The tie rod end 300 is constructed having a light preload, such as with a Bellville or wave washer, with an initial preload torque of about 24 in-lbs. As such, the as assembled preload torque of the tie rod end 300 is about the same as the tie rod end 10 and the tie rod end 200. However, upon conducting the 1 million cycle test, the resulting preload torque of the tie rod end 300 fell to about 12 in-lbs, which is lower than the resulting preload torque of the tie rod end 10.

Both the tie rod ends 10, 100, upon completing the 1 million cycles, resulted in substantially the same preload torque of about 20 in-lbs. Accordingly, the tie rod ends 10, 100 result in the best perceived torque upon completing the cycling test. This is due to the fact that the lubrication coating 26 on the tie rod end 10 is entirely or substantially consumed on the areas of contact between the ball 14 and the bearing portions 22, 24 in use over the 1 million cycles, with the resulting torque being between about 10 to 20 in-lbs, which corresponds generally to the resulting torque had the coating not been applied. However, as indicated, the tie rod end 10 with the lubrication coating 26 starts out with a significantly reduced and improved torque as result of the coating 26 in comparison to the tie rod end 100, being substantially one-half of that of the tie rod end 100.

Figure 5:
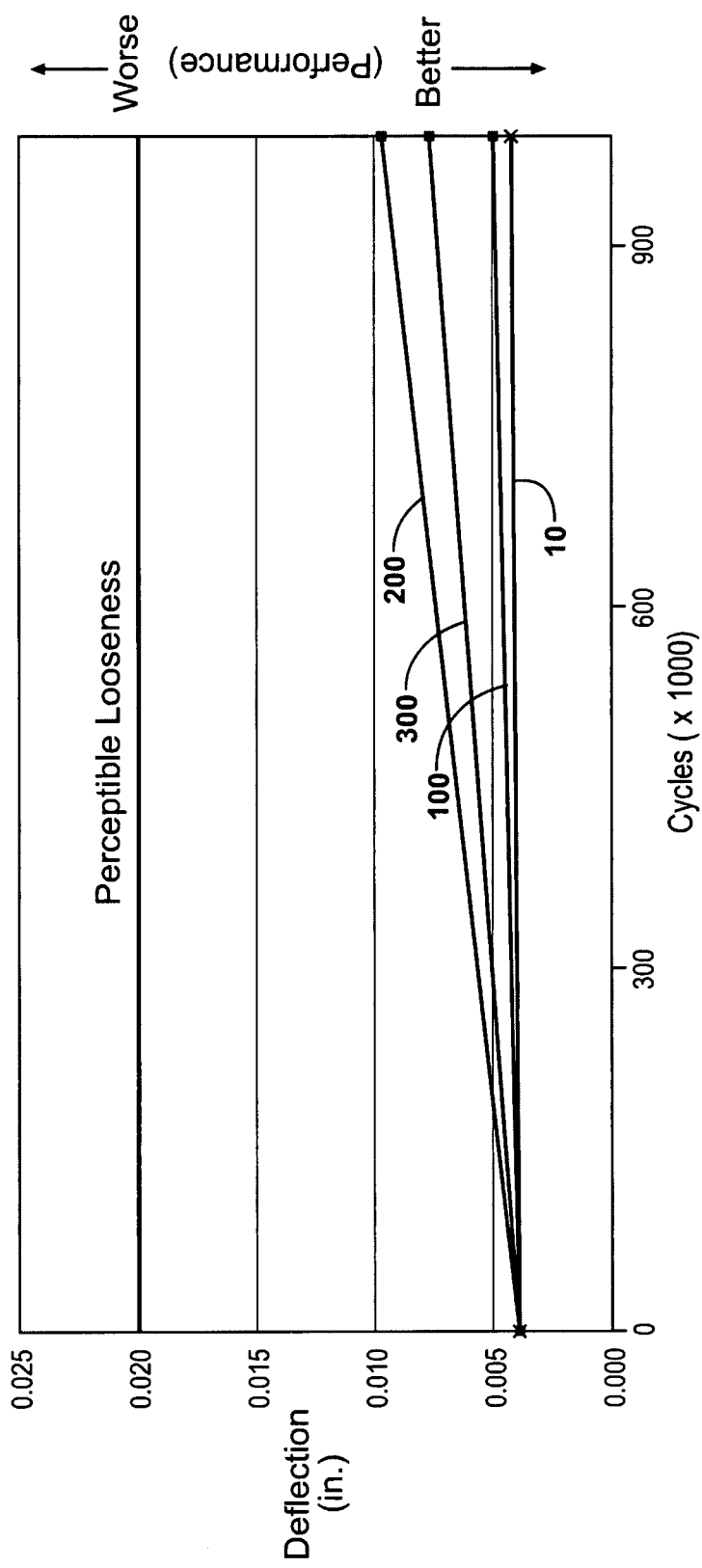
FIG. 5 is a graph illustrating the amount of deflection under load of the tie rod end of FIG. 1 in comparison to other conventional tie rod ends versus number of cycles of the tie rod ends.

As shown in FIG. 5, the tie rod ends 10, 100, 200, 300 were also run through another simulation test wherein the values were obtained using a 3-axis test simulator with an applied radial deflection force of +/−200 lbs to determine how much they would deflect under the applied load of +/−200 lbs over the course of a 1 million cycle test. The lower the amount of deflection the better because deflection is perceived as looseness, and a loose tie rod end can produce noise and result in backlash throughout the entire steering system, which can have a negative affect on numerous other vehicle steering components, including the tires. As shown, each of the tie rod ends 10, 100, 200, 300 were assembled having substantially the same amount of deflection of about 0.004 inches. The tie rod end 200 resulted in the most deflection at the end of the 1 million cycles, with a final deflection of about 0.010 inches. And so, even though the initial preload torque of the tie rod end 200 at initial assembly was slightly improved over the tie rod end 10 with the lubrication coating 26, both the resulting torque and the resulting deflection were far less desirable.

The tie rod end 300, upon completion of the 1 million cycles, had the second less desirable amount of deflection of about 0.008 inches. Next, the tie rod end 100, essentially the same as the tie rod end 10 but without the lubrication coating 26, had an amount of deflection of about 0.005 inches. Lastly, the tie rod end 10 exhibited the least amount of deflection of about 0.0045 inches, wherein the lubrication coating 26 was entirely or substantially consumed upon completion of the 1 million cycles, and more probably between about 100 to 500 thousand cycles. Accordingly, the lubrication layer 26 can be attributed with providing the tie rod end 10 with the best performance over the other tie rod ends 100, 200, 300, given it resulted with the best and most desired preload torque and deflection after completing the 1 million cycle tests.

Obviously, many modifications and variations of the present invention are possible in light of the above teachings. For example, as discussed above, it is contemplated that the ball 14 could have grooves for channeling grease, with the bearing surfaces 32, 34 being formed without grooves. It is, therefore, to be understood that within the scope of the appended claims, the invention may be practiced otherwise than as specifically described.

What is claimed is:

1. A tie rod and assembly for a vehicle comprising:
 a tie rod having a stud portion and ball member at one end;
 a housing member having an internal cavity open at least at one end;
 said tie rod ball member positioned in said cavity in said housing;
 a lower bushing member positioned in said housing cavity between said ball member and an inner surface of said cavity;
 said lower bushing member having a curved surface at a first end corresponding to the curvature of the ball member and having a first plurality of axial lubrication grooves therein;
 an upper bushing member positioned in said housing cavity between said ball member and said lower bushing member;
 said upper bushing member having a curved surface corresponding to the curvature of the ball member and having a second plurality of lubrication grooves therein; and
 the curved surface of the upper bushing member and the curved surface of the lower bushing member being coated with an anti-friction coating to provide said stud portion with a preload torque of 30-40 in-lbs at initial assembly and wherein said anti-friction coating is consumable at a rate such that said preload torque of said stud portion decreases from 30-40 in-lbs at initial assembly by a rate of approximately 1 in-lb per 100,000 cycles.

2. The tie rod and assembly as described in claim 1 wherein said ball member has a spherical shape.

3. The tie rod and assembly as described in claim 1 wherein said first plurality of axial lubrication grooves extend the full axial length of said lower bushing member, and said second plurality of axial lubrication grooves extend the full axial length of said upper bushing member.

4. The tie rod and assembly as described in claim 1 wherein said anti-friction coatings on both the upper and lower bushing members is the same.

5. The tie rod and assembly as described in claim 1 wherein said ball member is uncoated.

6. The tie rod and assembly as described in claim 1 wherein said anti-friction coating on said upper bushing member is polymer-based.

7. The tie rod and assembly as described in claim 1 wherein said anti-friction coating on said lower bushing member is polymer-based.

8. The tie rod and assembly as described in claim 1 wherein said anti-friction coatings on both of said upper and lower bushing members are polymer based.

9. The tie rod and assembly as described in claim 1 wherein said anti-friction coatings on said upper and lower bushing members are bonded thereto.

10. A tie rod and assembly for a vehicle comprising:
 a tie rod having a stud portion and ball member at one end;
 a housing member having an internal cavity open at least at one end;
 said tie rod ball member positioned in said cavity in said housing;
 a lower bushing member positioned in said housing cavity between said ball member and an inner surface of said cavity;
 said lower bushing member having a curved surface at a first end corresponding to the curvature of the ball member and having a first plurality of axial lubrication grooves therein;
 an upper bushing member positioned in said housing cavity between said ball member and said lower bushing member;
 said upper bushing member having a curved surface corresponding to the curvature of the ball member and having a second plurality of lubrication grooves therein; and
 the curved surface of the upper bushing member and the curved surface of the lower bushing member being coated with an anti-friction coating to provide said stud portion with a preload torque of 30-40 in-lbs at initial assembly and wherein said anti-friction coating is consumable at a rate such that said preload torque of said stud portion decreases from 30-40 in-lbs at initial assembly by a rate of approximately 1 in-lb per 100,000 cycles.

* * * * *